US008243902B2

(12) United States Patent
Caspi et al.

(10) Patent No.: US 8,243,902 B2
(45) Date of Patent: Aug. 14, 2012

(54) METHOD AND APPARATUS FOR MAPPING OF CONFERENCE CALL PARTICIPANTS USING POSITIONAL PRESENCE

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1094 days.

(21) Appl. No.: 11/904,955

(22) Filed: Sep. 27, 2007

(65) Prior Publication Data
US 2009/0086949 A1 Apr. 2, 2009

(51) Int. Cl.
*H04M 3/42* (2006.01)
(52) U.S. Cl. .......... 379/202.01; 379/201.01; 379/201.06; 379/142.05; 379/88.01; 379/88.02; 455/563; 455/558; 704/235; 704/246; 704/248
(58) Field of Classification Search ............. 379/202.01, 379/207.11, 201.01, 201.06, 142.05, 88.01, 379/88.02; 455/556.1, 558, 563; 704/201, 704/235, 246, 248
See application file for complete search history.

(56) References Cited

U.S. PATENT DOCUMENTS

| | | | |
|---|---|---|---|
| 6,469,732 B1* | 10/2002 | Chang et al. ............... 348/14.08 |
| 6,533,171 B1 | 3/2003 | Porter | |
| 6,609,653 B1 | 8/2003 | Lapstun et al. | |
| 6,644,545 B1 | 11/2003 | Lapstun et al. | |
| 6,983,309 B1 | 1/2006 | Yoshizawa | |
| 7,203,132 B2 | 4/2007 | Berger | |
| 7,246,099 B2 | 7/2007 | Feldhan | |
| 7,305,078 B2* | 12/2007 | Kardos ..................... 379/202.01 |
| 7,920,158 B1* | 4/2011 | Beck et al. ................. 348/14.08 |
| 2002/0138633 A1 | 9/2002 | Angwin et al. | |
| 2003/0125954 A1 | 7/2003 | Bradley et al. | |
| 2003/0211856 A1* | 11/2003 | Zilliacus ..................... 455/466 |
| 2003/0231746 A1 | 12/2003 | Hunter et al. | |
| 2004/0091086 A1 | 5/2004 | Ortel | |
| 2007/0036289 A1 | 2/2007 | Fu et al. | |

FOREIGN PATENT DOCUMENTS

EP 1276304 A2 1/2003
EP 1589730 A1 10/2005

OTHER PUBLICATIONS

Michael Sokolov, speaker Verification on the World Wide Web, 5th European Conference on Speech Communication and Technology, Sep. 22, 1997, pp. 847-850, Eurospeech'97, Rhodes, Greece.
Internet Mail Consortium; "vCard Overview", Internet citation, URL:www.imc.org/pdi/vcardoverview.html.
José Ramón Calvo De Lara, A Method of Automatic Speaker Recognition Using Cepstral Features and Vectorial Quantization, Progress in Pattern Recognition, Image Analysis and Applications Lecture Notes in Computer Science, Jan. 1, 2005, pp. 146-153, vol. 3773, LNCS, Springer, Berlin, DE.
Carlo Busson et al., Smart Room:Participant and Speaker Localization and Identification, IEEE International Conference of Acoustics, Speech and Signal Processing, Mar. 2005, pp. 1-4, Philadelphia, USA.

* cited by examiner

*Primary Examiner* — Antim Shah

(57) ABSTRACT

A method includes receiving audio electronic business card data during a conference; comparing said audio electronic business card data with voices of conference speakers to confirm identities of said speakers; performing an acoustic triangulation to determine a position of speakers; correlating a position of said speakers with said identities; and displaying locations of said speakers.

13 Claims, 11 Drawing Sheets

METHOD AND APPARATUS FOR MAPPING OF CONFERENCE CALL PARTICIPANTS USING POSITIONAL PRESENCE

CROSS-REFERENCE TO RELATED APPLICATIONS

This application is related to co-pending, commonly assigned U.S. patent application Ser. No. 11/904,649, titled "Method and Apparatus for Secure Electronic Business Card Exchange", and co-pending, commonly assigned U.S. patent application Ser. No. 11/904,651, "Method and Apparatus for Identification of Conference Call Participants," both filed concurrently herewith.

BACKGROUND OF THE INVENTION

1. Field of the Invention

This invention relates to telecommunications systems. More particularly, the invention relates to a method and apparatus for automatically identifying and mapping participants in a conference call.

2. Description of the Related Art

Conference calling is an important and increasingly useful business tool, particularly with the advent of new multimedia conferencing applications that allow for advanced collaboration, whiteboarding, and video conferencing. Often, multiple parties in multiple locations engage in such calls. That is, a group gathers in a conference room at one location while another group gathers in a conference room at another location.

Often it is desirable to explicitly identify all parties to the conference. While a party designated as a moderator or host could individually poll all participants to verbally identify themselves, this can take an extended period and occupy valuable working time. As such, there is a need for an improved method for identifying participants in a conference.

Further, it is often the case that participants in a conference are not well-acquainted with other participants. In such instances, particularly when the conference is relatively large, having a pile of business cards or even a list of participants is not necessarily enough for a participant to readily identify a given speaker. As such, there is a need for an improved method for identifying particular speakers in a conference.

SUMMARY OF THE INVENTION

These and other drawbacks in the prior art are overcome in large part by a system and method according to embodiments of the present invention.

A method according to embodiments of the present invention includes receiving audio electronic business card data during a conference; comparing said audio electronic business card data with voices of conference speakers to confirm identities of said speakers; performing an acoustic triangulation to determine a position of speakers; correlating a position of said speakers with said identities; and displaying locations of said speakers.

A telecommunications system in accordance with embodiments of the present invention includes a network; a conference control unit operably coupled to the network and configured to poll a plurality of user devices for audio electronic business card data and receive said data from said plurality of user devices and identify participants to a conference based on said audio electronic business card data; and a conference mapping unit configured to identify locations of participants responsive to their speaking and to display a map of said locations while respective participants are speaking. In some embodiments, the conference mapping unit is configured to perform an acoustic triangulation to determine a location of a particular speaker.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
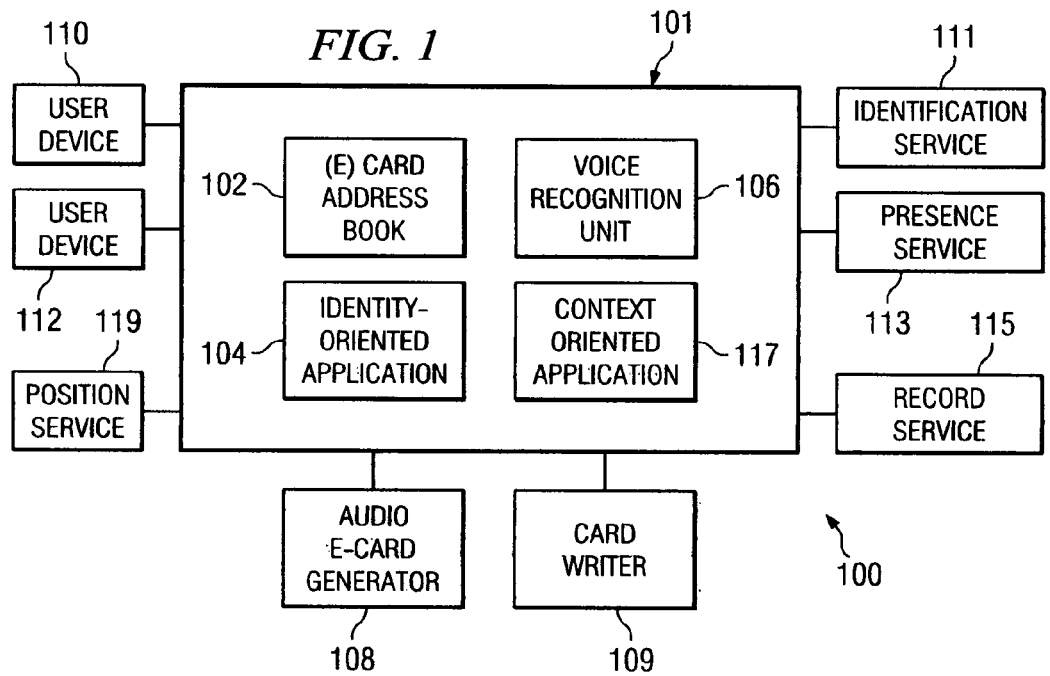
FIG. 1 illustrates an exemplary system according to embodiments of the present invention.

Turning now to the drawings and, with particular attention to FIG. 1, a diagram of a telecommunications system 100 according to an embodiment of the present invention is shown. The telecommunications system 100 may include a processing or conferencing system 101, which may include or be in communication with an electronic business card address book 102, a voice recognition unit 106, and a security-oriented application 104.

The processing system 101 may include or be in communication with an audio electronic business card generator 108 in accordance with embodiments of the present invention. As will be explained in greater detail below, the audio electronic business card generator 108 may be used to generate, read, and/or store an audio electronic business card. In particular, in some embodiments, an audio electronic business card, including one or more integrated voice samples or other integrated voice data, such as pre-processed voice recognition data, may be generated and stored in an address book. Such an audio electronic business card may also be transferred using, e.g., wireless technology such as Bluetooth or a wireless LAN standard such as IEEE 802.11g. In other embodiments, voice data may be provided to a standard business card; the voice data may be read, uploaded and converted into an audio electronic business card format, such as Versitcard, or vCard.

The processing or conferencing system 101 may further include or be in communication with a presence service 113, a conferencing recording service 115, an identification or verification service 111, one or more context-oriented applications 117, and a positioning service 119. As will be explained in greater detail below, in some embodiments, the identification service 111 can poll users to send their audio electronic business cards. The identification service 111 can then store the business card data and use it for identification purposes when a participant speaks. This information can then be provided to the recordation service 115 and the presence service 113. The recordation service 115 may function to provide a text-based or other transcript or minutes of the meeting. The presence service 113 monitors user presence status. In addition, the identification information can be used in conjunction with the positioning service 119 to determine the placement of participant speakers in a conference room, as well as, in some embodiments, out of room or remote speakers.

User devices, such as user devices 110, 112 may be connected to or in communication with the processing system 101. In certain embodiments, the user devices may be implemented as telephones, cellular telephones, PDAs, computers, hard or soft clients, etc. For example, user devices 110, 112 may be embodied as personal computers implementing the Windows XP operating system and the Explorer web browser. In addition, the user devices 110, 112 may include telephony and other multimedia messaging capability using, for example, peripheral cameras, Webcams, microphones, and speakers (not shown) or peripheral telephony handsets, such as the optPoint handset available from Siemens Communication, Inc. The user devices 110, 112 may be used to record and transmit or otherwise transfer electronic business card data to and from each other and other devices. In general, while the user devices may implement one or more of the systems and methods described herein, the user devices also may implement one or more client devices or programs that communicate with services that implement such systems and methods provided remotely.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

As will be discussed in greater detail below, in certain embodiments, the processing system 101 can receive audio electronic business card data. This can include, for example, digitized audio samples, as well as, or alternatively, pre-processed audio data. Such data can be stored in the electronic business card address book 102, and be available for other applications and/or services, including use by the security-oriented application 104, voice recognition unit 106, and identification service 111.

For example, once the audio business card data has been stored, the VRU 106 can detect voice inputs and access the audio data to perform voice recognition functions and/or verification functions either alone or in conjunction with the identification unit 111; if the incoming speech is recognized, in some embodiments, access may be provided to the security-oriented application 104. If the user is identified, the information can be provided to the presence service 113 and recordation service 115, as will be explained in greater detail below.

The processing system 101 may be implemented in hardware and/or software operating on one or more servers, computer systems, host or mainframe computers, workstations, etc. In some embodiments, the processing system 101 may be operating on some or all of the same devices as other components in the system 100.

The audio electronic business card generator or input control unit 108 may be embodied as a business card reader configured to print and/or read a physical business card and convert it into an electronic business card standard or may itself be configured to generate an audio electronic business card.

As will be discussed in greater detail below, in card reader embodiments, the audio electronic business card generator 108 may be implemented as one or more readers capable of reading, for example, magnetic strips or a barcode reader. The electronic business card generator 108 can thus read a business card including the appropriate coding, which can then be uploaded to the system 101, for example, as an electronic business card.

As noted above, other embodiments of the audio electronic business card generator 108 are capable of directly generating the electronic business card once the user information is entered, as will be explained in greater detail below. For example, in some embodiments, the audio electronic business card generator 108 can include voice input devices such as microphones and analog-to-digital converters to receive and digitize a speaker's voice sample. Other embodiments may further encode the speech sample as preprocessed voice recognition data.

For example, some speech recognition systems make use of a Hidden Markov Model (HMM). A Hidden Markov Model outputs, for example, a sequence of n-dimensional real-valued vectors of coefficients (referred to as "cepstral" coefficients), which can be obtained by performing a Fourier transform of a predetermined window of speech, decorrelating the spectrum, and taking the first (most significant) coefficients. The Hidden Markov Model may have, in each state, a statistical distribution of diagonal covariance Gaussians which will give a likelihood for each observed vector. Each word, or each phoneme, will have a different output distribution; a hidden Markov model for a sequence of words or phonemes is made by concatenating the individual trained Hidden Markov Models for the separate words and phonemes. Decoding can make use of, for example, the Viterbi algorithm to find the most likely path.

Embodiments of the present invention thus include an encoder to provide, e.g., the coefficients, or even the output distribution as the pre-processed voice recognition data. It is noted, however, that other speech models may be used and thus the encoder may function to extract other speech features.

The audio electronic business card generator 108 may be implemented in software operating on one or more servers, computer systems, host or mainframe computers, workstations, etc. In some embodiments the audio electronic business card generator 108 may be operating on some or all of the same device(s) as other components in the system 100.

In certain embodiments, the system includes or is in communication with a card writer 109 capable of printing or writing machine readable media, such as magnetic media or barcodes onto a standard business card. In particular, the card writer 109 may be used to write barcode-encoded speech samples or pre-processed speech data onto a business card. The card writer 109 may be implemented in software operating on one or more servers, computer systems, host or mainframe computers, workstations, etc. In some embodiments the card writer 109 may be operating on some or all of the same device(s) as other components in the system 100.

In some embodiments, the processing system 101 additionally includes or is in communication with a presence and availability service (PAS) 113. The presence and availability service 113 may be or include an application that monitors the presence and availability of devices or identities. That is, the presence and availability service 113 monitors the presence state or device context of one or more devices. The presence and availability service 113 may further determine a user presence status or identity context from the device information. In some embodiments, recordation of audio electronic business card data and/or identification of participants causes the presence and availability service 113 to update a presence status or context of the party or device.

In some embodiments an identity may be or include an individual person or a group of people. An identity context for an identity could be a state of "in a meeting," "on vacation," "in the office," "out of the office," "roaming," "offline," "online," "in transit," "mobile," etc. Thus, the identity context describes the implied availability of the identity. An identity may have one or more devices associated with it. For example, a person may have an associated office telephone, a home telephone, a cellular telephone, computer, PDA, etc. Each device may have an associated device context. For example, the person's office telephone may be busy, set to "do not disturb," automatic call forwarding, offline, etc. Context for a device may describe the work or non-work state, and/or the availability or non-availability state that the device is in.

In some embodiments, different applications may be used to set, monitor or change a context for a device or identity. For example, software operating on a computer may allow an identity to indicate manually or automatically that the computer is unavailable for email, instant messaging, file transfer or other communications at the current time, at a specific later time, during a time range, etc. As another example, a wireless and instant messaging capable PDA may be considered as having a device context as "available" by the presence and availability service 113 when the PDA is online and a device context of "unavailable" by the presence and availability service 113 when the PDA is offline. In addition, a telephony program may define a user as "busy" when he is active with another call.

Similarly, a user may make use of an application to indicate that he is "in meeting" or "at home," when he wishes this information to be promulgated. In addition, as will be described in greater detail below, the identification service 111 may be used to update a presence state or context upon identifying a particular speaker, in accordance with embodiments of the present invention.

The presence and availability service 113 may be implemented in software operating on one or more servers, computer systems, host or mainframe computers, workstations, etc. In some embodiments the presence and availability service 113 may be operating on some or all of the same device(s) as other components in the system 100.

In some embodiments, the presence and availability service 113 may be or include an application that communicates with or is connected to one or more registered devices (e.g., devices 110, 112), that allows devices to register with the system 100 or helps facilitate their registration, etc. For example, in a SIP environment, the devices 110, 112 may be registered with the system 100 and may show up or be described in registration databases as being assigned to particular identities.

The context-oriented application 117 may register with the presence and availability service 113 and receive device or identity context and/or other information from the presence and availability service 113 regarding the devices 110, 112. In some embodiments, the presence and availability service 113 may provide device and/or identity context information upon request, periodically, or in accordance with some other plan or procedure. A presence and availability service that may be suitably adapted for use in conjunction with the present invention is the OpenScape system, available from Siemens Comm., Inc.

The context-oriented application 117 may be or include an application that uses, collects, refers to, etc. information regarding a presence context, such as the identity context of one or more identities. For example, a context-oriented application 117 may be or include software that allows identities to provide information regarding their availability, location, etc. In some embodiments, a user device, server, host or mainframe computer, workstation, etc. may include a context-oriented application or have one operating or residing on it. The context-oriented application 117 may be implemented in hardware and/or software operating on one or more servers, computer systems, host or mainframe computers, workstations, etc. In some embodiments the context-oriented application 117 may be operating on some or all of the same device(s) as other components in the system 100.

The security-oriented application 104 may be any application that makes use of or requires identification confirmation or verification for access or other purposes. The security-oriented application 104 may be implemented in hardware and/or software operating on one or more servers, computer systems, host or mainframe computers, workstations, etc. In some embodiments the security-oriented application 104 may be operating on some or all of the same device(s) as other components in the system 100.

The identification service 111 operates in conjunction with the address book 102 and voice recognition unit 106 to identify a speaker during the conference. In particular, the identification service 111 causes the voice recognition unit 106 to compare a speaker's voice to the voice sample or preprocessed voice recognition data that is stored in the address book 102, determine a match. The identification service 111 can then provide an identification to other applications. The identification service 111 may be implemented in hardware and/or software operating on one or more servers, computer systems, host or mainframe computers, workstations, etc. In some embodiments the identification service 111 may be operating on some or all of the same device(s) as other components in the system 100.

The recording service 115 may be an application and hardware that functions to record and annotate, take minutes of, or otherwise memorialize a multimedia conference. In some embodiments, the recording service 115 may include a speech-to-text agent that converts spoken words into text.

Any suitable recording service 115 and text-to-speech agent may be employed. As will be explained in greater detail below, the recording service 115 may receive identification information from the identification service 111 so as to identify parties to the conference in the recorded minutes. The recording service 115 may be implemented in hardware and/or software operating on one or more servers, computer systems, host or mainframe computers, workstations, etc. In some embodiments the recording service 115 may be operating on some or all of the same device(s) as other components in the system 100.

The positioning or mapping service 119 may include an application and associated hardware that determines positions of conference participants, using information from the identification service and audio triangulation techniques. The positioning service 119 can then generate a graphic indicating which parties to the conference are located where. In some embodiments, it can further identify which participants are speaking at particular times. The positioning service 119 may be implemented in hardware and/or software operating on one or more servers, computer systems, host or mainframe computers, workstations, etc. In some embodiments the positioning service 119 may be operating on some or all of the same device(s) as other components in the system 100.

In some embodiments, as will be explained in greater detail below, the identification may be provided to a graphical user interface and used to display an identification of participants and/or a current speaker. In addition, a location mapping of participants may be provided.

Figure 2:
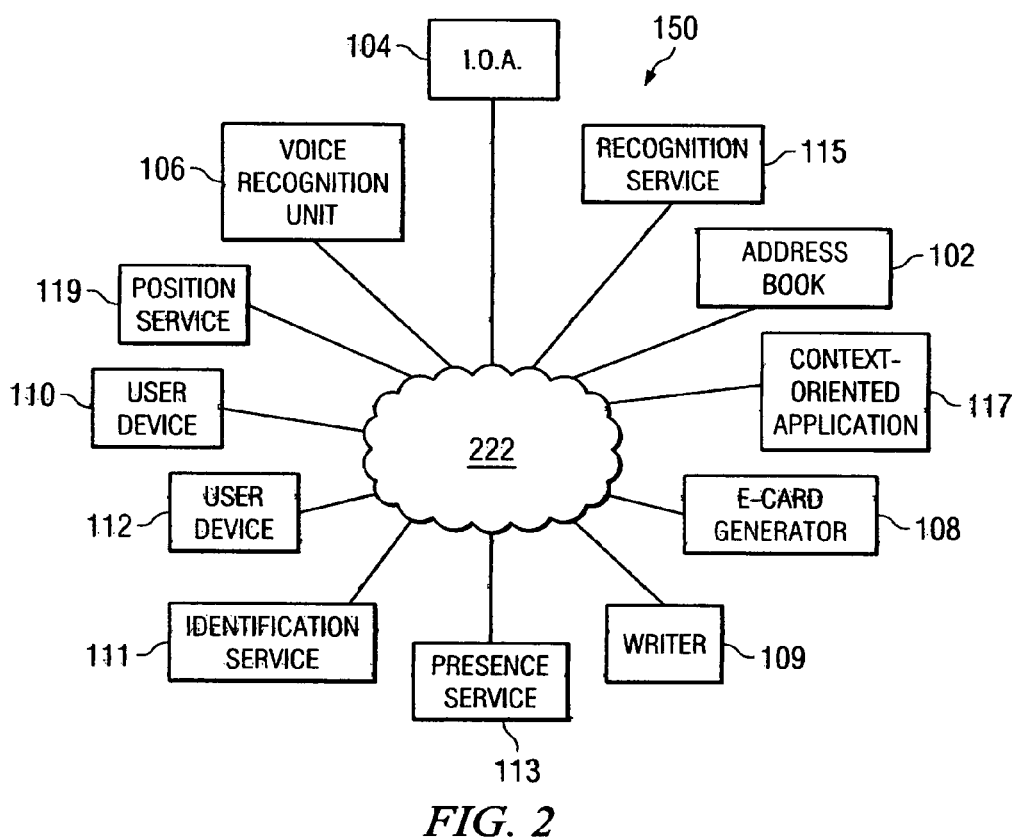
FIG. 2 illustrates an exemplary system according to embodiments of the present invention.

In certain embodiments of the present invention, one or more of the components of the system 100 may be connected to or in communication with each other via a communication network. For example, turning now to FIG. 2, a system 150 including the components of the system 100 is illustrated, wherein some or all of the components are in communication via a network 122. The network 122 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, the public switched telephone network (PSTN), etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP). In some embodiments, the network 122 is implemented as a Bluetooth compatible piconet or scatternet.

Audio Electronic Business Cards

As discussed above, one aspect of the present invention relates to providing an audio electronic business card and using it to transfer integrated audio data. While in general any format may be used to the business card, an exemplary embodiment provides an enhanced vCard to include user voice data, according to embodiments of the present invention, as will be explained in greater detail below.

An exemplary vCard showing how sound is incorporated is shown below. In particular, shown in Example 1 below is a vCard including full party name, name, address, telephone number, and sound properties (typically, not all such sound properties would be provided in a given vCard):

```
begin:vcard
fn:Rami Caspi
n:Caspi; Rami
adr:;123 Main Street; Sunnyvale; CA; 98401; USA
tel:408-555-1212
SOUND:RAMI CASPI
SOUND;VALUE=URL:file///multimed/audio/caspi.wav
SOUND;WAVE;BASE64:
    UklGRhAsAABXQVZFZm10IBAAAAABAAEAESsAABErAAABAAgAZGF0YesrAACAg4eC
    eXR4e3uAhoiIiYmKjIiDfnx5eX6CgoKEhYWDenV5fH6BhISGiIiDfHZ2eXt/hIiK
    jY2IhH12d3Vyc3uDiIiFf3l7fn18eXl+houFf319fnyAgHl5eoCIiISChIeAfnt2
        ...
end:vcard
```

Sound or audio is incorporated into the SOUND property and can have one of three values: a string-based phonetic representation; a reference to an URL (digital audio representation); or an inline digital audio representation of the phonetic pronunciation of the formatted name property (fn). Thus, in the example above, SOUND:RAMI CASPI is the string-based phonetic representation; SOUND;VALUE=URL:FILE///MULTIMED/AUDIO/CASPI.WAV is the digital sound representation and URL based value; and SOUND;WAVE;BASE64: (etc.) is the digital sound representation and inline value.

A property parameter (TYPE=) specifies the type of digital audio pronunciation for the vCard object. For example, WAVE represents Wave format; PCM indicates MIME basic audio type; AIFF indicates AIFF format; and URL represents a location where the corresponding file can be found.

Embodiments of the present invention introduce a voice recognition property VOICEREC that may be incorporated into the vCard. The voice recognition property may identify one or more voice recognition algorithms that may be used, and can identify the voice recognition data, such as vector coefficients or other extracted features, as discussed above. The VOICEREC property data may be provided inline or referenced via an URL. The VOICEREC can thus have as values an identification of the URL or the inline value(s). A parameter property can be used to specify the particular algorithm.

An exemplary vCard employing such a VOICEREC property is shown in Example 2 below:

```
begin:vcard
fn:Rami Caspi
n:Caspi; Rami
adr:;123 Main Street; Sunnyvale; CA; 98401; USA
tel:408-555-1212
VOICEREC:RAMI CASPI
VOICEREC;VALUE=URL:file:///multimed/audio/caspi.txt
VOICEREC;HMM1:
    UklGRhAsAABXQVZFZm10IBAAAAABAAEAESsAABErAAABAAgAZGF0YesrAACAg4eC
    eXR4e3uAhoiIiYmKjIiDfnx5eX6CgoKEhYWDenV5fH6BhISGiIiDfHZ2eXt/hIiK
    jY2IhH12d3Vyc3uDiIiFf3l7fn18eXl+houFf319fnyAgHl5eoCIiISChIeAfnt2
        ...
end:vcard
```

Thus, according to an embodiment of the present invention, voice recognition pre-processed parameters are incorporated into the vCard and can have as properties a file or an inline representation. TYPE parameters specify the type of voice recognition algorithm being used. In the example illustrated, HMM1 Identifies a particular speech model, i.e., Hidden Markov Model 1. It is contemplated that a standard library of voice recognition algorithms may be provided. Thus, the pre-processed audio data can be used to identify parties or for other purposes.

In addition, in some embodiments, the audio file or data provided above can be used to identify the user. In such a case, either a conventional vCard may be used to transfer the voice file, or a VOICEREC property identifying the party (e.g., VOICEREC: Rami Caspi) can be transferred with the vCard.

As discussed above, in certain embodiments, a physical business card may be provided with a barcode or other similar coding. As noted above, this can include either the voice sample itself or the voice recognition pre-processed data discussed above.

Figure 3:
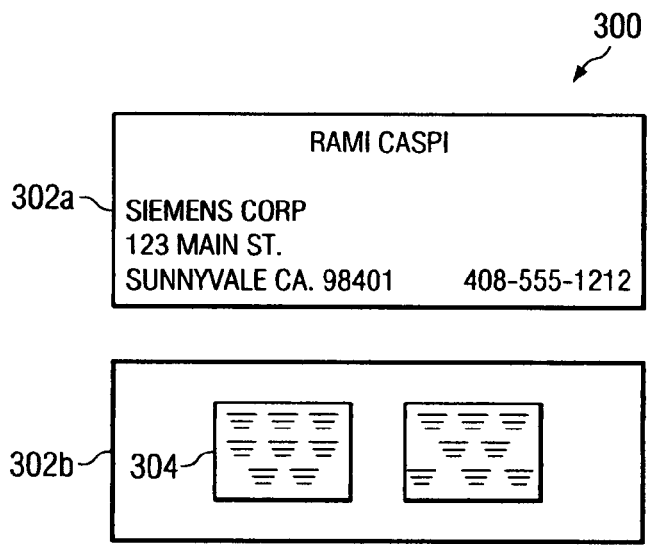
FIG. 3 illustrates an exemplary enhanced business card in accordance with embodiments of the present invention.

Turning now to FIG. 3, a diagram of an exemplary business card 300 is shown. Shown is a front 302a and a reverse 302b of a business card. Shown on the front 302a is standard business card information; shown on the reverse 302b is a bar code 304 including either coded audio or voice recognition data. The bar code may be any bar code of sufficient density to provide the desired information. These may include two-dimensional bar codes such as PDF-417 or DataMatrix.

In operation, a system in accordance with embodiments of the present invention can print or otherwise write the code to the business card. The bar code 304 is then readable and/or uploadable to a user device, which can then store and/or incorporate the information into an address book. In some embodiments, the bar code and business card information are converted into the vCard format prior to entering to the address book 102.

Figure 4:
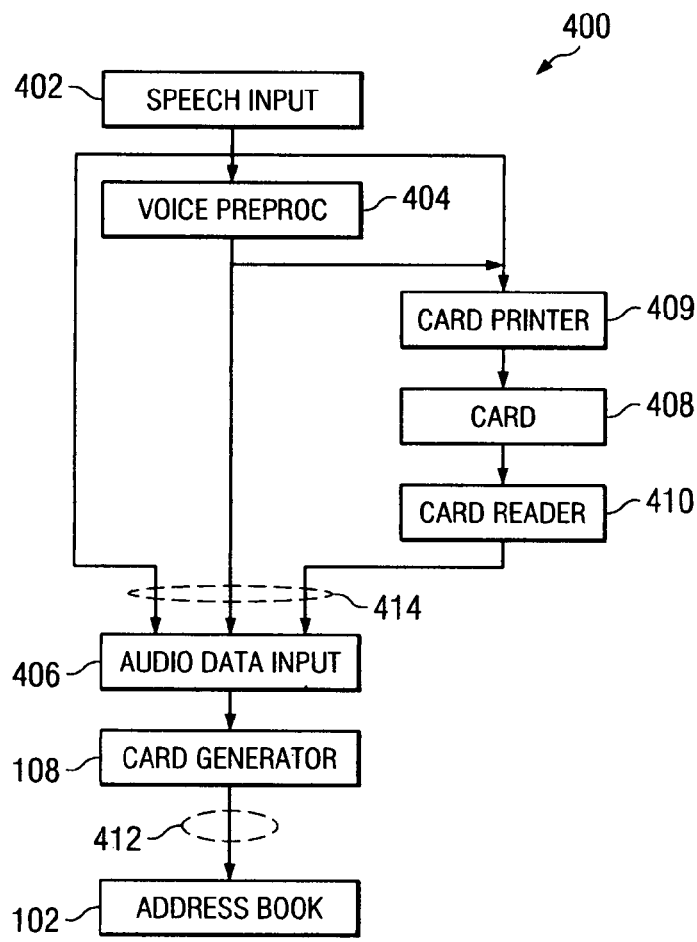
FIG. 4 is a diagram schematically illustrating embodiments of the present invention.

Turning now to FIG. 4, a diagram 400 schematically illustrating operation of embodiments of the present invention is shown. Shown in FIG. 4 are a card generator 108, which can provide the vCard to an address book 102. The card generator 108 receives its vCard data input from audio data input 406.

As noted above, the audio data input 406 can be received from a number of sources. For example, a speech input 402, such as by a user speaking his name, can provide direct audio input. Similarly, the direct speech can be received at a voice preprocessor 404 which can preprocess the voice, as described above. The speech preprocessor 404 output is then provided as the audio data input 406.

Alternatively, either the speech input 402 or the preprocessed input 404 can be provided to a card printer 409. The printer 409 can be used to print or encode and print the card 408. As discussed above, this can include a barcode or a magnetic encoding. The barcode printer may be embodied as a conventional barcode printer, such as a thermal barcode printer; in some embodiments, the barcode is printed onto an adhesive label that can then be affixed to the reverse of the business card. In others, the card may be printed on directly.

A card reader 410 can then be used to read the barcode or other encoding. As noted above, the card reader may be embodied as a barcode scanner, such as the HawkEye 50T Hand-Held Scanner available from Siemens. The output of the bar code reader 410 can then be provided as audio data input 406.

As shown at 414 and 412, the audio data and the card data can be communicated to the address book via a wireless interface, such as a Bluetooth interface. For example, the Bluetooth Object Push Profile defines a way of transferring a vCard. Embodiments of the present invention extend the Object Push Profile to accommodate a vCard that includes the voice recognition data of the present invention. This can include, for example, configuring the profile to recognize the VOICEREC parameter discussed above.

Figure 5:
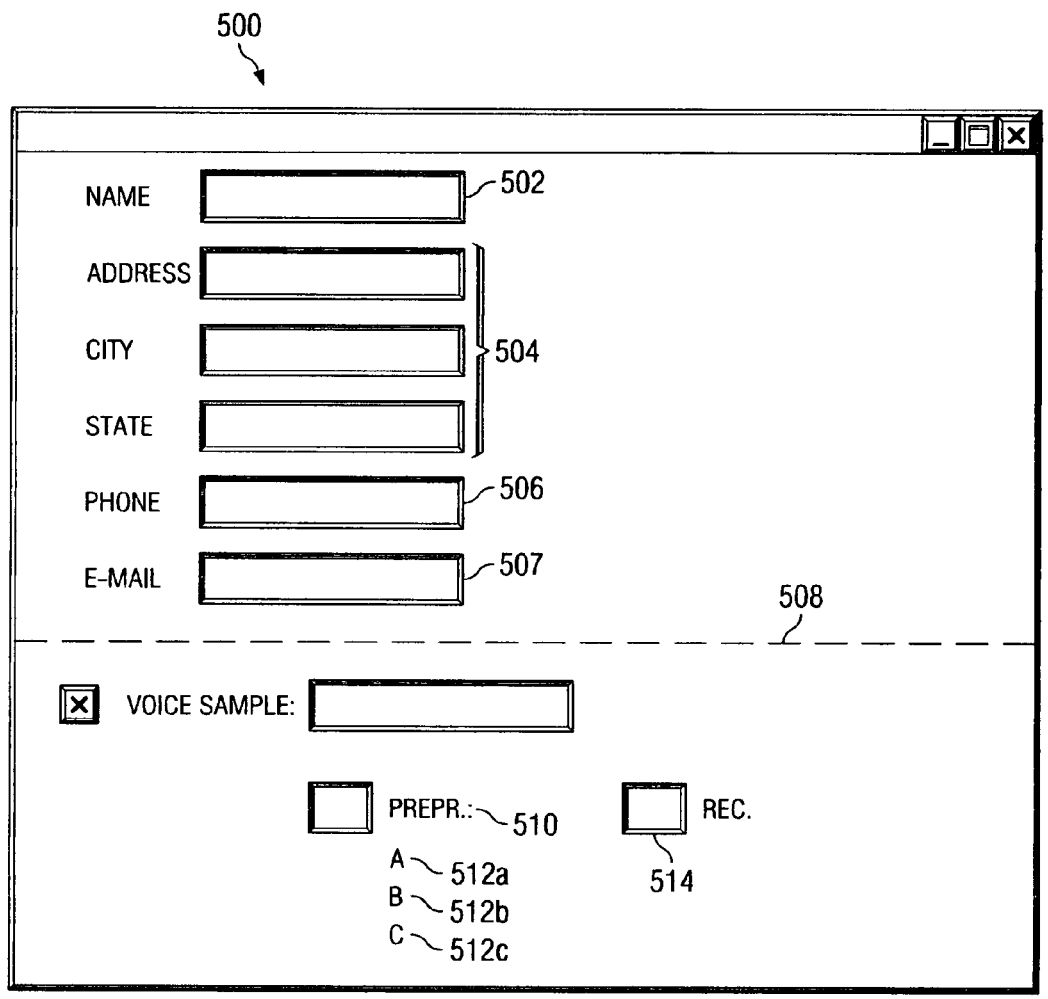
FIG. 5 is an exemplary user interface for use with embodiments of the present invention.

FIG. 5 is an exemplary user interface that may be used to provide inputs for generating an audio electronic business card in accordance with embodiments of the present invention. In operation, the user would fill out the fields, and an audio electronic business card generator engine would convert the input fields into a business card format, such as a vCard format.

The user interface may run, for example, on one of the user devices. The interface 500 includes entry fields for names 502, addresses 504, telephone 506, and e-mail 507. It is noted, however, that additional for information may be provided, such as for fax numbers, cell phone numbers, etc. Thus, the figure is exemplary only.

In addition, according to embodiments of the present invention, the user interface includes a voice entry interface 508. The voice entry interface 508 allows a user to selectively input a voice sample. The user may, for example, click on "Record" 514 and speak into an attached microphone (not shown) to record, digitize, and store the voice sample (typically, the speaker's name).

Alternatively, the user can select preprocessing 510, which can allow the user to select among a plurality of voice recognition preprocessing techniques 512a, 512b, 512c. In operation, the user could select or click on preprocessing and select the algorithm 512a, 512b, 512c. He would then speak the voice sample, which would be preprocessed according to the algorithm. It is noted that, while a choice of three is illustrated, in practice, the actual number may be greater or fewer.

Further, in some embodiments, the voice entry interface 508 is the only interface provided, such as when the system is used to print the barcode or magnetic strip onto the business card. Thus, the figures are exemplary only.

Figure 6:
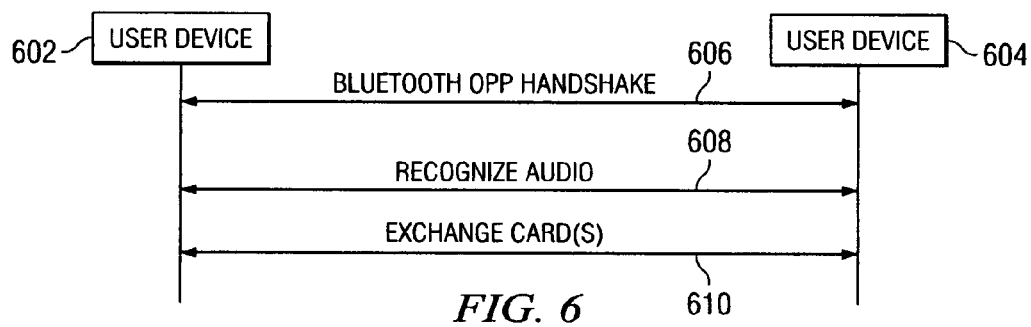
FIG. 6 is a diagram illustrating operation of an embodiment of the present invention.

Turning now to FIG. 6, a diagram illustrating signaling according to an embodiment of the present invention is shown. In particular, FIG. 6 illustrates exemplary communication between two user devices 602, 604 to allow transfer of an audio electronic business card in accordance with embodiments of the present invention. As noted above, user devices may be implemented as wireless communication devices, such as laptop computers, or cellular telephones equipped with Bluetooth interfaces.

At 606, the user devices 602, 604 communicate using Bluetooth handshaking and, particularly, Object Push Profile handshaking. At 608, the devices recognize that the exchange is of audio electronic business cards and, in some embodiments, of audio data-enhanced vCards, such as voice recognition data enhanced vCards. Finally, at 610, the audio electronic business cards are exchanged, including the audio data and, if necessary, an identification of a particular pre-processing voice recognition algorithm.

Figure 7:
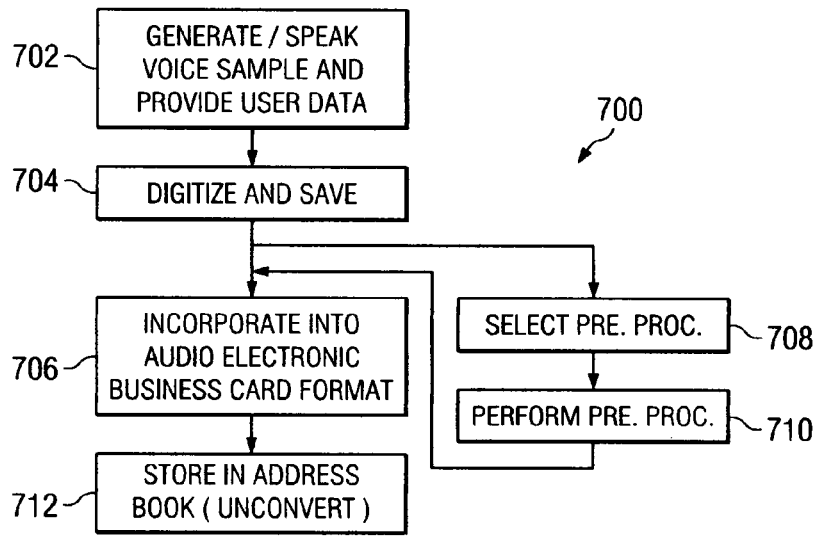
FIG. 7 is a flowchart illustrating operation of an embodiment of the present invention.

Turning now to FIG. 7, a flowchart 700 illustrating operation of embodiment of the present invention is shown. The particular arrangement of elements in the flowchart 700 is not meant to imply a fixed order to the elements; embodiments can be practiced in any order that is practicable.

In a process step 702, a user may provide business card data and may further speak a voice sample into a microphone associated with the corresponding user device. For example, the user may speak his name or other sample. In a process step 704, the user device may digitize and save the voice sample and other data.

In a process step 706, the user device may incorporate the saved voice sample into an audio electronic business card. As discussed above, in some embodiments, this may be an enhanced vCard. In a process step 712, the audio electronic business card is received in an address book 102. In some embodiments, it is converted out of the audio electronic business card format into another address book format. It is noted that, in other embodiments, the steps 706, 712 may be reversed. That is, the user data is not converted into an audio electronic business card until after being stored in the address book 102. The business card information is then available in an electronic format for transferring to other devices, such as via the enhanced Blutetooth OPP discussed above.

Further, as discussed above, in some embodiments, the digitized voice sample may be pre-processed for voice recognition. Thus, after a process step 704, in a process step 708, according to some embodiments, the user can select for pre-processing and/or can select a particular algorithm for pre-processing. The actual pre-processing may then be performed in a process step 710, and the process proceeds as above to process step 706.

Figure 8A:
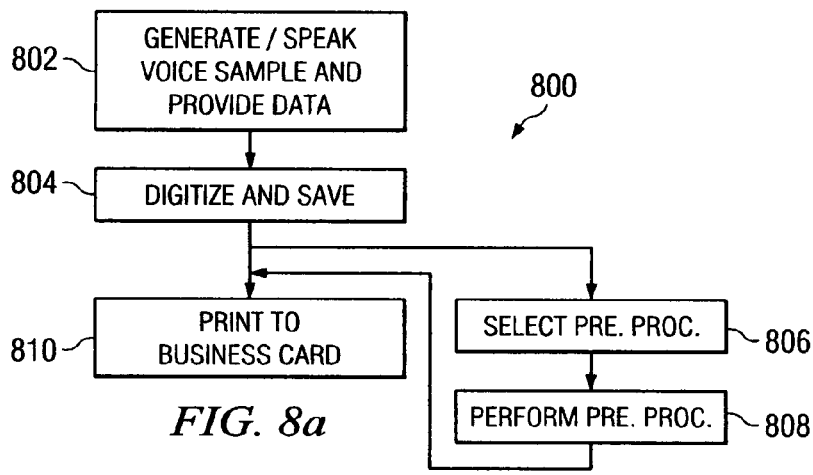
FIG. 8A-FIG. 8C are flowcharts illustrating operation of embodiments of the present invention.

Turning now to FIG. 8A, a flowchart 800 illustrating operation of embodiment of the present invention is shown. The particular arrangement of elements in the flowchart 800 is not meant to imply a fixed order to the elements; embodiments can be practiced in any order that is practicable.

In a process step 802, a user may provide business card data and may further speak a voice sample into a microphone associated with the corresponding user device. For example, the user may speak his name or other sample. In a process step 804, the user device may digitize and save the voice sample and other data.

In a process step 810, the user device may print the audio data and other data to a business card. As discussed above, this can include printing a barcode on the card or on an adhesive strip. While, typically, the barcode would include only the voice data, in other embodiments, it could include the standard business card data as well.

Further, as discussed above, in some embodiments, the digitized voice sample may be pre-processed for voice recognition. Thus, after a process step 804, in a process step 808, according to some embodiments, the user can select for pre-processing and/or can select a particular algorithm for pre-processing. The actual pre-processing may then be performed in a process step 810, and the process proceeds as above to process step 810.

It is noted that, in some embodiments, the audio business card data and any standard business card data may be used as discussed above with reference to FIG. 7 to generate an audio electronic business card as well as allowing the printed card generation.

Figure 8B:
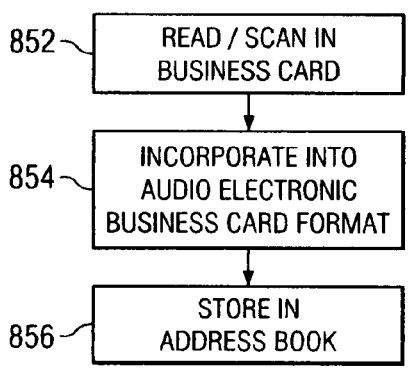

Turning now to FIG. 8B, a flowchart 850 illustrating operation of embodiment of the present invention is shown. The particular arrangement of elements in the flowchart 850 is not meant to imply a fixed order to the elements; embodiments can be practiced in any order that is practicable.

In a process step 852, a business card may be scanned by a user device. As discussed above, a user device may be provided with or be in communication with, for example, a barcode scanner and can scan a business card for audio (and other) data.

In a process step 854, the user device may incorporate the saved voice sample into an audio electronic business card. As discussed above, in some embodiments, this may be an enhanced vCard. In a process step 856, the audio electronic business card is received in an address book 102. In some embodiments, it is converted out of the audio electronic business card format into another address book format. It is noted that, in other embodiments, the steps 854, 856 may be reversed. That is, the user data is not converted into an audio electronic business card until after being stored in the address book 102. The business card information is then available in an electronic format for transferring to other devices, such as via the enhanced Blutetooth OPP discussed above.

Figure 8C:
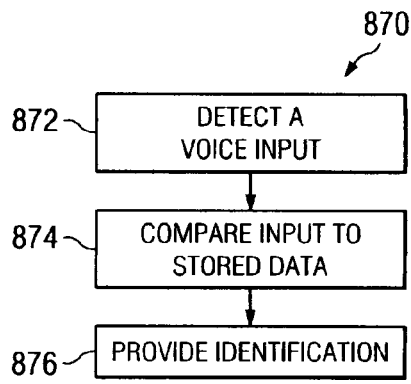

Turning now to FIG. 8C, a flowchart 870 illustrating operation of embodiment of the present invention is shown. The particular arrangement of elements in the flowchart 870 is not meant to imply a fixed order to the elements; embodiments can be practiced in any order that is practicable.

In a process step 872, the voice recognition unit 106, either by itself or in conjunction with the identification unit 111, detects a voice input. As discussed above, this can occur during the course of a conference or call, for example, by a participant speaking into a microphone.

In a step 874, the voice recognition unit 106 accesses the voice recognition data stored in association with the address book 102 and performs an analysis or comparison on the received voice data and the stored data.

Finally, in a step 876, the voice recognition unit 106 identifies the speaker and provides this information to other applications, such as the identity-oriented application 104.

Identification of Conference Call Participants

As noted above, according to embodiments of the present invention, audio electronic business cards can be used to identify conference call participants during and after a teleconference. In particular, as will be explained in greater detail below, according to embodiments of the present invention, an audio electronic business card can be uploaded or received, in a manner similar to that discussed above, to a conferencing service and used to identify speakers.

Figure 9:
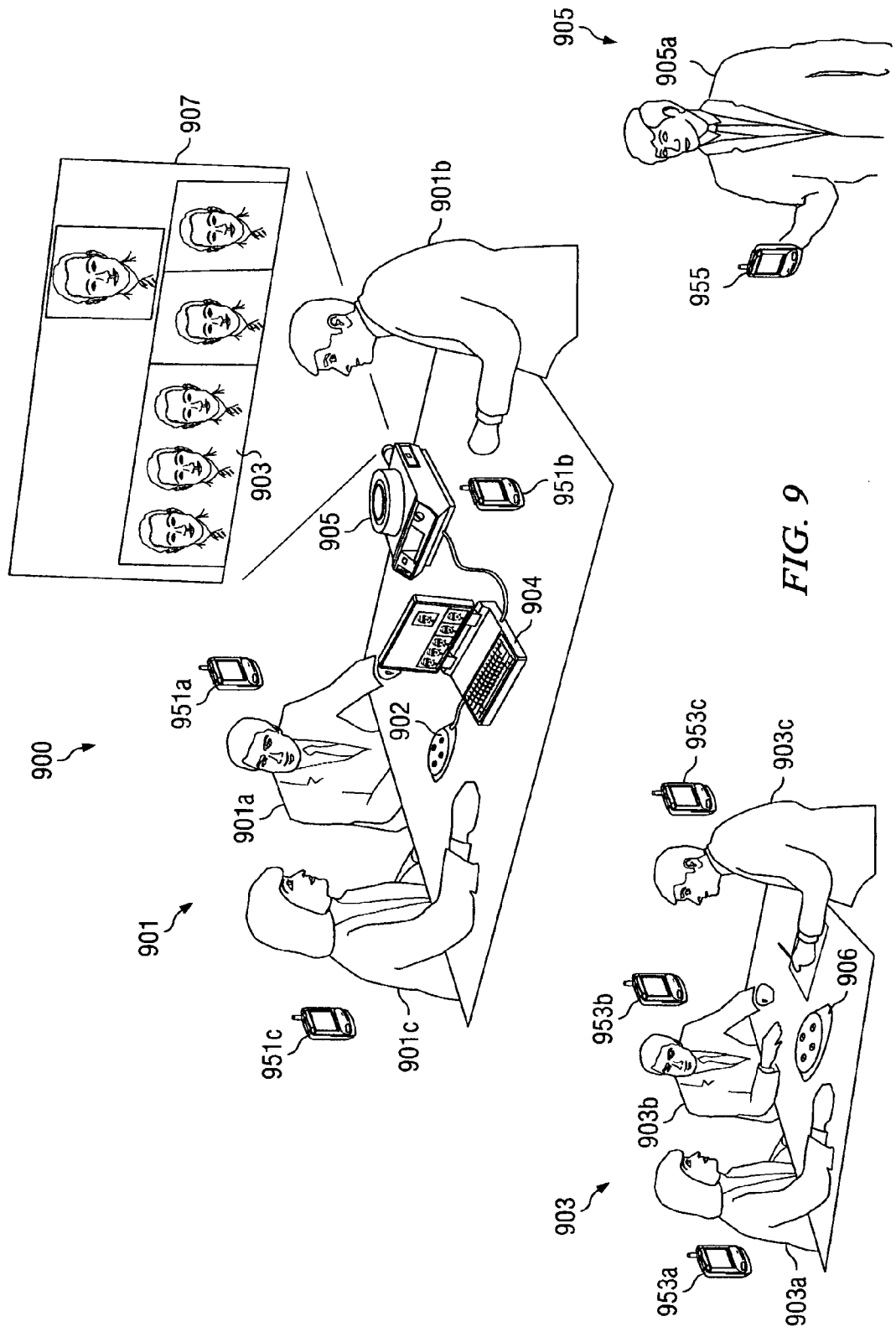
FIG. 9 illustrates an exemplary environment for a system in accordance with embodiments of the present invention.

An exemplary environment illustrating use of embodiments of the present invention is shown in FIG. 9. In particular, the environment 900 of FIG. 9 illustrates a conference call with users at multiple locations 901, 903, 905. Participants 901a-901c are present at location 901. Participants 903a-903c are present at location 903, and participant 905a is present at location 905.

Typically, in a group environment, such as a conference room, the participants use a common conferencing device or control unit 911 set in a "speakerphone" mode to conduct the conference. The common conferencing device 911 may be implemented as a conferencing device or telephone 902 and a computing device 904.

At location 901, the participants use a conferencing device 902; at location 903, the participants use conferencing device 906, and at location 905, the participant uses his cellular telephone as his conferencing device. In addition, as will be explained in greater detail below, the conferencing device 902 may include or be coupled to a personal computer 904 that may implement one or more of the systems and methods in accordance with the present invention. In addition, the common conferencing device 911 may implement one or more client devices or programs that communicate with services provided remotely. In addition, a projector 905 may be coupled to provide a view of the computer or conferencing display on a screen 907.

It is noted that various of the services and other control units may be implemented at a remote server or servers, or locally at a conferencing computer. For example, the conferencing control unit 911 may be implemented as a Microsoft Roundtable system, suitably modified to execute various methods and system described herein. Other systems and methods in accordance with the present invention may be implemented in whole or in part at a remote server (not shown).

In addition, each user is typically equipped with a cellular telephone or similar wireless communication device, such as a laptop computer, or other system and/or method for providing an audio electronic business card. This is shown with respect to location 901 at 951a, 951b, 951c; at location 903 with respect to 953a-953c, and at location 907, with reference to 955. As will be explained in greater detail below, the wireless communications devices may be equipped with audio electronic business card receivers such as discussed above.

A conferencing device in accordance with embodiments of the present invention may implement one or more of the components of the processing system of FIG. 1. For sake of convenience, discussion will focus on the conferencing device at location 901. Thus, the conferencing device 902 may include or be in communication with a processing device 904.

In operation, participants 901a-901g gather at location 901 and dial in to the conference; in particular, conferencing device 902 may dial in to or implement a conferencing server (not shown); similarly, users at locations 903, 905 dial in to the conference.

The conferencing device 902 may be networked into a local Intranet and/or include one or more network interfaces in accordance with embodiments of the present invention. At the outset of, or at intervals during, the conference, according to embodiments of the present invention, the conferencing device 902 transmits to or polls cellular telephones 951 that are in range. The cellular telephones 951 respond with their audio electronic business cards. In some embodiments, the polling occurs using a Bluetooth connection and the audio electronic business cards are vCards. In other embodiments, any type of ad hoc or other networking may be used for the polling. Thus, the figures are exemplary only. In embodiments in which a physical card is used, the conferencing device 902 may be provided with a card reader, such as those discussed above.

The identification service 111 (FIG. 1) receives the audio electronic business cards and can enter them into an address book 102, in a manner similar to that discussed above. The address book 102 may, for example, be a permanent address book or only a temporary one for the duration of the conference.

The identities of the participants, as determined from received cards, can then be provided to identity-oriented applications 104, such as the presence service 113, the recording service 115, and the positioning service 119.

The presence service 113 can then update the presence status or context of participants; for example, the presence service 113 could indicate that the participants are "In Meeting." Identities of remote parties may similarly be obtained, and their presence status similarly updated. Thus, registered or otherwise authorized users of an associated presence system would see that the participants are "In Meeting."

Figure 10:
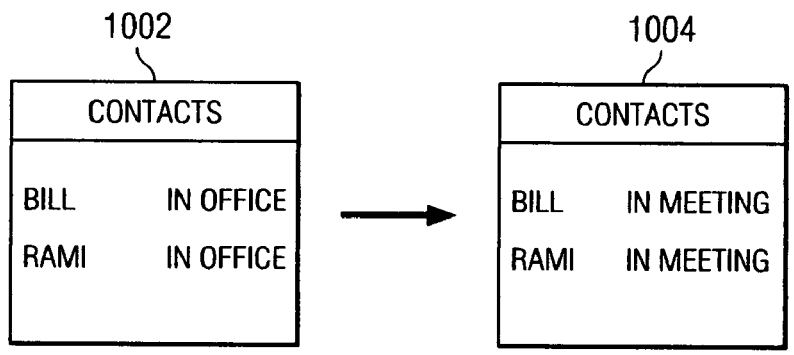
FIG. 10 is a diagram illustrating an exemplary user interface and operation of embodiments of the present invention.

For example, turning now to FIG. 10, an exemplary contacts list 1002 is shown, that may be part of, for example, a user interface for a presence client, or unified messaging system including presence capabilities, running on computing device 904. As shown, users Bill and Rami are present in the user's contacts list and are indicated to be In Office. At 1004, however, after the presence service 113 has received the conference identification information from the identification unit 111, they are indicated to be In Meeting.

During the conference, when the participants are speaking, the voice recognition unit 106 and/or identification unit 111 receives the voice inputs and accesses the business card data, in a manner similar to that discussed above. The resulting identity data can then be provided to the recording service 115, to identify particular speakers for the recorded minutes.

Figure 11:
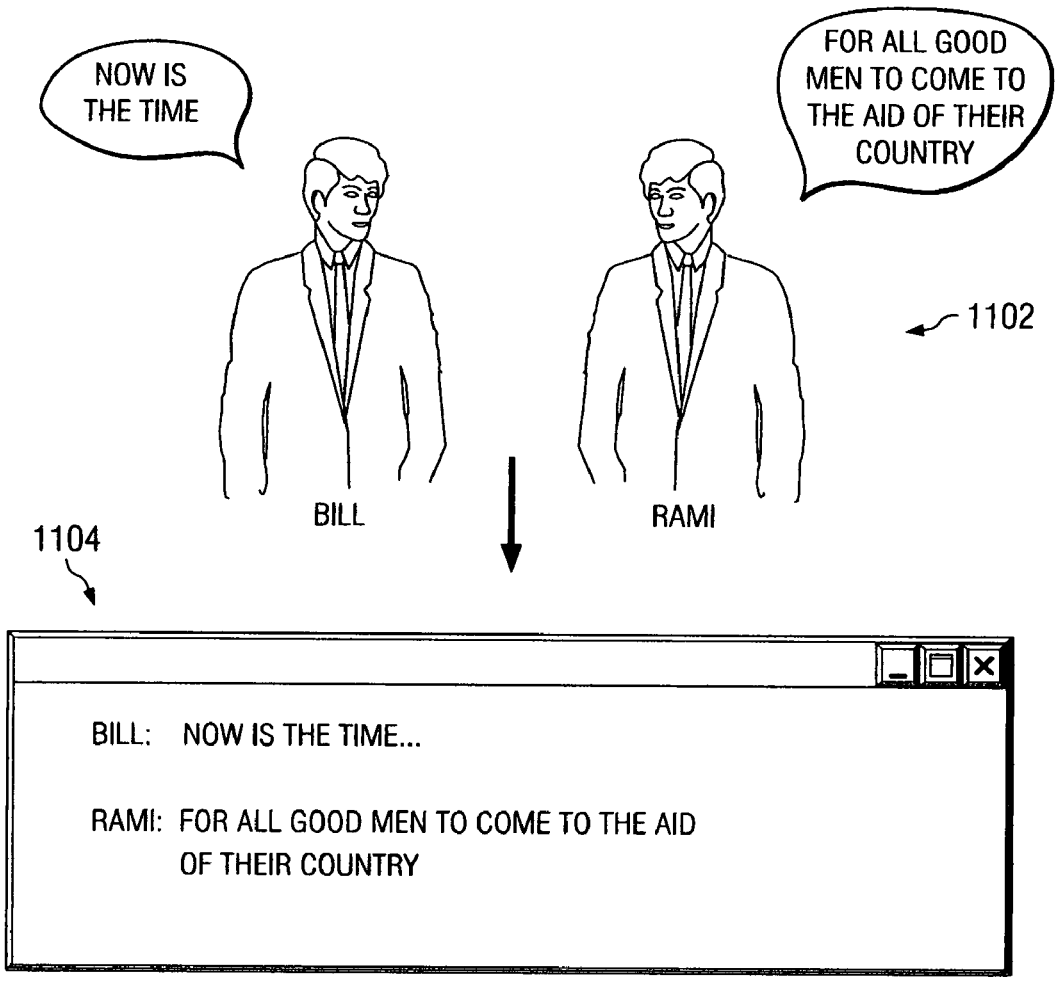
FIG. 11 is a diagram illustrating an exemplary user interface and operation of embodiments of the present invention.

This is illustrated by way of example with reference to FIG. 11. For example, as seen at 1102, speaker Bill is saying "Now is the time" and speaker Rami is saying "for all good men to come to the aid of their country." Embodiments of the present invention identify the speakers and associate them with the transcript, viewable in, for example, a graphical user interface, as shown at 1106.

Figure 12:
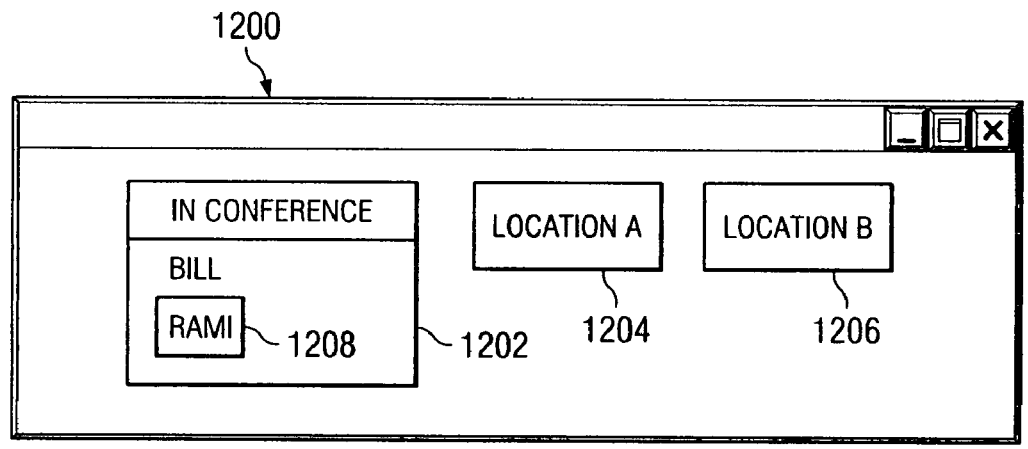
FIG. 12 is an exemplary user interface according to embodiments of the present invention.

In addition, the identification information may be provided to the parties' user interfaces, to indicate the identity of a current speaker. For example, turning now to FIG. 12, a diagram illustrating an exemplary graphical user interface 1200 is shown. The graphical user interface 1200 may be displayed, for example, using computer 904 and projected onto a conference room wall or screen with projector 905.

As can be seen, the interface 1200 indicates conference participants. According to some embodiments, the interface indicates where individuals are, i.e., if they are in the local conference room or are calling in remotely. Thus, in the example illustrated, conference participants are indicated to be at location A 1202, location B 1204, or location C 1026. Furthermore, according to some embodiments, an indication is made of who the present speaker is. Thus, as shown, in the example illustrated, speaker Rami is highlighted at 1208.

Figure 13:
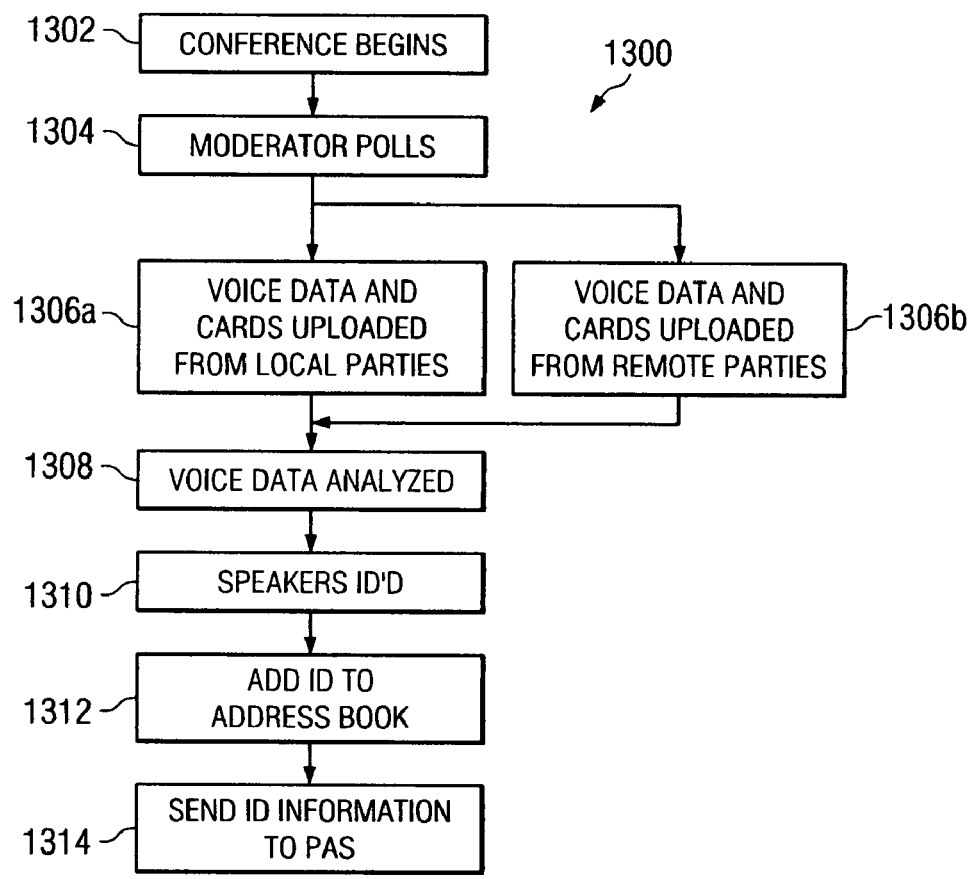
FIG. 13 is a flowchart illustrating operation of an embodiment of the present invention.

Turning now to FIG. 13, a flowchart 1300 illustrating operation of embodiment of the present invention is shown. The particular arrangement of elements in the flowchart 1300 is not meant to imply a fixed order to the elements; embodiments can be practiced in any order that is practicable.

In a process step 1302, a teleconference can begin. For example, various parties can call in to a conferencing server or service 101 via a common conferencing telephone, e.g., conferencing device 902. An exemplary conferencing server is available with, for example, Siemens Openscape. In a process step 1304, the moderator can cause the teleconferencing telephone 902 or computing device 904 to poll other participants' cell phones or wireless devices. For example, the moderator may select one or more controls from a graphical user interface associated with the conferencing device. As discussed above, this can include ad hoc networking, or can include using a local Intranet or similar network. In a process step 1306a, the audio electronic business cards of the local participants can be uploaded to the service, in a manner similar to that discussed above. Similarly, in a process step 1306b, the audio electronic business cards of remote participants can be uploaded. For example, the audio electronic business cards can be sent from remote locations as attachments to e-mails.

In a process step 1308, the audio electronic business card data can be analyzed. For example, the audio electronic business card data can be decoded and unpacked from the e-mail, etc. The participants can be identified, in a process step 1310, and can be added to, for example, an address book 102, in a step 1312.

Alternatively, or in addition, in a step 1314, the identification unit 111 can provide the identification information to the presence service 113, which can then update the presence of the local parties. The presence information may thus be made available to one or more context-oriented applications 117.

Figure 14:
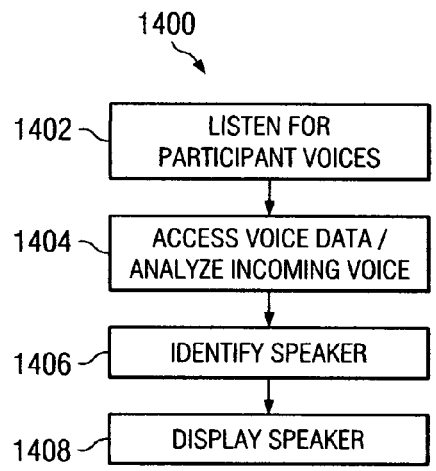
FIG. 14 is a flowchart illustrating operation of an embodiment of the present invention.

Turning now to FIG. 14, a flowchart 1400 illustrating operation of embodiment of the present invention is shown. The particular arrangement of elements in the flowchart 1400 is not meant to imply a fixed order to the elements; embodiments can be practiced in any order that is practicable.

Once the audio electronic business card data has been stored and/or the presence states of the participants has been updated, the conference begins, and the voice recognition unit 106 and/or identification unit 111 listens for speaker voices, in a process step 1402. In a process step 1404, the voice data may be extracted from the sample and the voice data from the address book accessed, so as to analyze the voice input. In a process step 1406, the participant may be identified, in a manner similar to that discussed above. Finally, in a process step 1408, the identification of the participant may be displayed on an accompanying graphical user interface.

Figure 15:
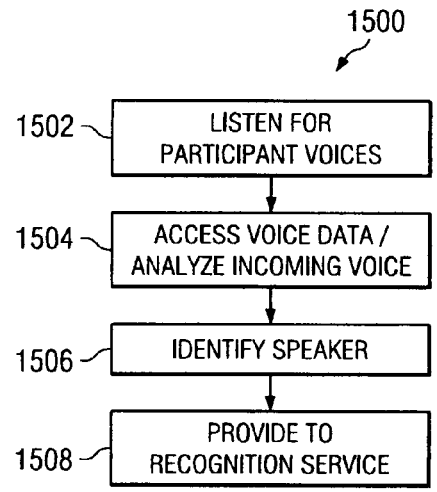
FIG. 15 is a flowchart illustrating operation of an embodiment of the present invention.

Turning now to FIG. 15, a flowchart 1500 illustrating operation of embodiment of the present invention is shown. The particular arrangement of elements in the flowchart 1500 is not meant to imply a fixed order to the elements; embodiments can be practiced in any order that is practicable.

Once the audio electronic business card data has been stored and/or the presence states of the participants has been updated, the conference begins, and the voice recognition unit 106 and/or identification unit 111 listens for speaker voices, in a process step 1502. In a process step 1504, the voice data may be extracted from the sample and the voice data from the address book accessed, so as to analyze the voice input. In a process step 1506, the participant may be identified, in a manner similar to that discussed above. Finally, in a process step 1508, the identification of the participant may be provided to the recording service 115 and associated with the current speaker when minutes are made.

Finally, it is noted that, depending on the implementation, the possibility exists that multiple cell phones may attempt to communicate their audio electronic business card data concurrently. Thus, in some implementations of the present invention, the cell phones use a modified CSMA/CD algorithm for collision resolution. When a transmission attempt has terminated due to a collision, it is retried by the transmitting cell phone after a selected backoff time until either the transmission is successful or a maximum number of attempts have been made and all have terminated due to collisions. The backoff time is selected by each phone as an integral multiple of a predetermined time (In standard CSMA/CD, this is referred to as "slot time" which is the maximum round trip propagation time for the network, i.e., the time required to propagate a data packet from one end of the network to the other and back). The number of slot times selected as the backoff time before the nth retransmission is chosen as a randomly distributed integer r in the range:

$$0 \leq r \leq 2^k, \text{ where } k=\min(n, 10).$$

Therefore, for the first attempted retransmission, the backoff time is selected as 0 or 1 slot times. For the second attempted retransmission the backoff time is selected as 0, 1, 2 or 3 slot times. For the third attempted retransmission, the backoff time is selected as 0, 1, 2, 3, 4, 5, 6 or 7 slot times and so on, up to a maximum backoff time of up to 1,023 slot times.

Thus, according to embodiments of the present invention, the conference device 911 detects a collision and sends a retransmit request to the cell phone 951. The cell phone 951 waits the retransmit period prior to transmitting again.

Figure 16:
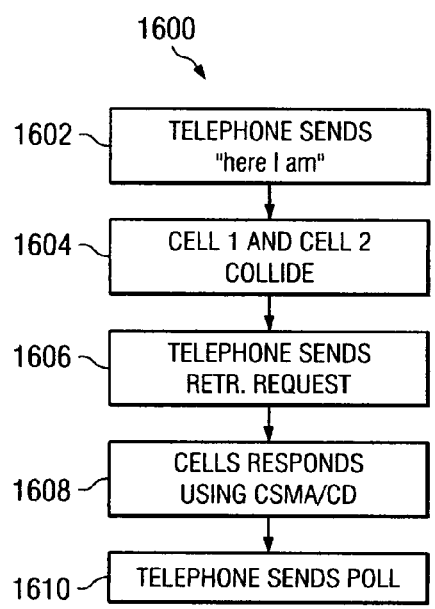
FIG. 16 is a flowchart illustrating operation of an embodiment of the present invention.

Turning now to FIG. 16, a flowchart 1600 illustrating operation of embodiment of the present invention is shown. The particular arrangement of elements in the flowchart 1600 is not meant to imply a fixed order to the elements; embodiments can be practiced in any order that is practicable.

In a step 1602, at the outset of a conference, the conferencing telephone 902 sends out a "here I am" signal to any cell phones that might be listening. In response, in a step 1604, the listening cell phones attempt to respond. Depending on the standard being used, they might collide due to a simultaneous response.

In a process step 1606, the conferencing phone 902 can detect the collision and send a retry request to the colliding cell phones. In a process step 1608, the cell phones respond using the collision avoidance algorithm. Finally, in a process step 1608, they connect and the master 902 sends a poll for audio electronic business cards.

Conference Participant Mapping

As noted above, there are often business scenarios wherein not all persons are known to all participants in a given conference. Embodiments of the present invention thus make use of the audio electronic business card data to identify speakers. Embodiments of the present invention further can be enhanced to map individual speakers. That is, the conferencing system 101 can be provided with acoustical microphones and a positioning system 119 to identify where particular speakers are sitting at a table. In particular, the positioning system 119 according to embodiments of the present invention makes use of acoustical triangulation techniques to pinpoint a speaker's location.

Figure 17:
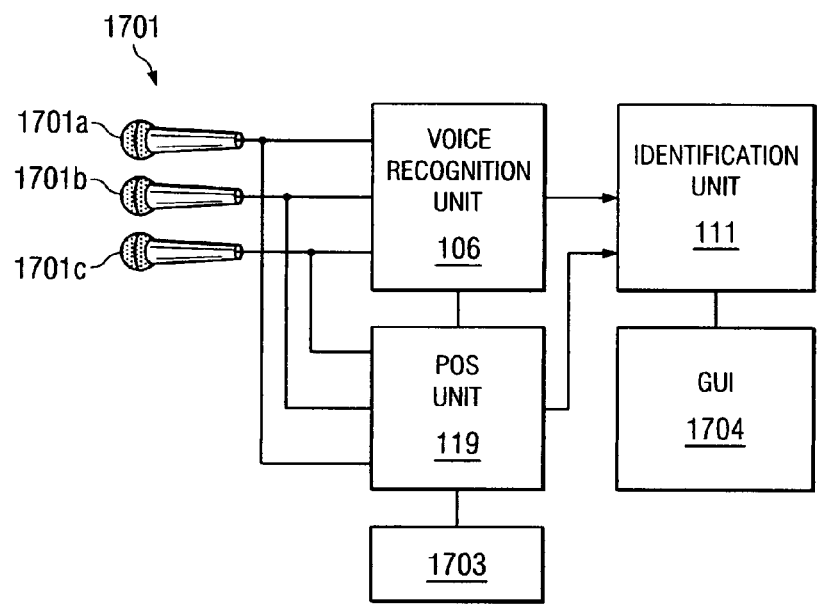
FIG. 17 is a block diagram illustrating a system according to embodiments of the present invention.

Such a system is shown in greater detail in FIG. 17. That is, FIG. 17 is a diagram of an exemplary system that allows for acoustic triangulation and identification of participants' locations.

Shown are a plurality of microphones 1701, a voice recognition unit 106, a positioning unit 119, identification unit 111, and graphical user interface 1704. Also coupled to or in communication with the positioning service 119 is a clock 1703.

In operation, microphones 1701a, 1701b, 1701c are distributed around a conference room. For example, they may be placed on a conference table or suspended from a conference room ceiling, etc. The microphones 1701 receive voice input, which is detected by the voice recognition unit 106. The voice recognition unit 106 provides inputs to the identification unit 111, which accesses records to identify the particular speaker, in a manner similar to that discussed above. The voice recognition unit 106 may determine that a given audio input is voice and provide a signal to the positioning unit 119, which also receives the input.

The positioning unit 119 detects an input at a particular microphone. It then begins a count of clock cycles from clock 1703. The positioning unit 119 determines how many clock cycles elapsed between the input at the first microphone and at the second and third microphones, and uses this to derive a distance from the source of the speech input and thus the position of the speaker.

The identification unit 111 then uses the location information from the positioning unit 119 and the identification and provides a control to the GUI 1704, which displays the result.

Figure 18:
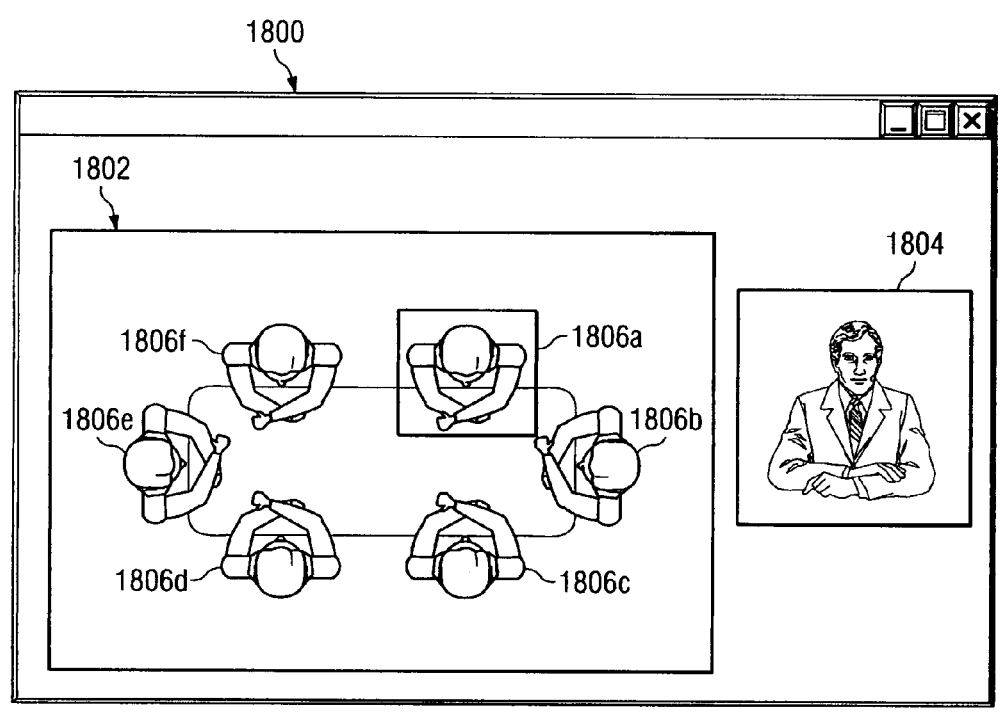
FIG. 18 is an exemplary user interface for use with embodiments of the present invention.

For example, FIG. 18 is a diagram illustrating an exemplary graphical user interface 1800 that allows for display of speaker location. As shown, the GUI 1800 includes a mapping window 1802 and can also include a speaker window 1804. The mapping window 1802 displays a map of the conference room including participants positions 1806a-1806f. When an identified participant is speaking, the GUI 1800 can display the participant's name and also highlight the user's seating position, as well as showing a close up of the speaker. Thus, as shown, speaker 1806a is highlighted and would appear in window 1804. In addition, provision may be made for displaying identities of non-local parties, i.e., those at remote locations.

Figure 19:
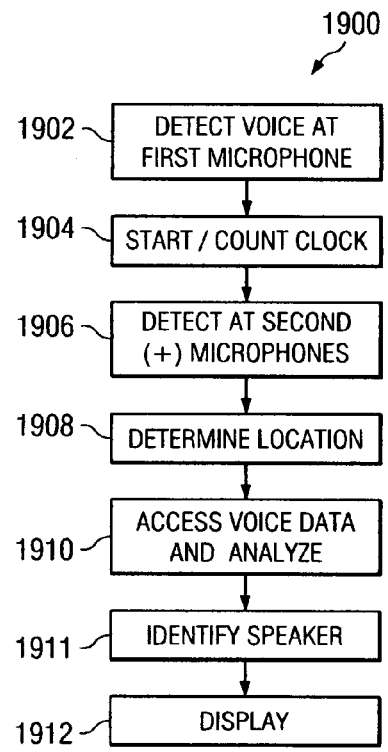
FIG. 19 is a flowchart illustrating operation of an embodiment of the present invention.

Turning now to FIG. 19, a flowchart 1900 illustrating operation of embodiment of the present invention is shown. The particular arrangement of elements in the flowchart 1900 is not meant to imply a fixed order to the elements; embodiments can be practiced in any order that is practicable.

Once the audio electronic business card data has been stored and/or the presence states of the participants has been updated, the conference begins, and the voice recognition unit 106 listens for speaker voices and the positioning unit 119 listens to detect voices at a first microphone, in a process step 1902.

In a process step 1904, the positioning unit 119 begins a clock or begins counting clock cycles. In a process step 1906, the positioning unit 119 can detect a voice input at another of the microphones. The positioning unit 119 stops the clock and uses the number of cycles to derive a position of the speaker, in a step 1908.

In addition, in a process step 1910, the voice data may be extracted from the sample and the voice data from the address book accessed, so as to analyze toe voice input. In a process step 1911, the participant may be identified, in a manner similar to that discussed above. Finally, in a step 1912, the identification and location of the participant may be displayed on an accompanying graphical user interface.

Figure 20:
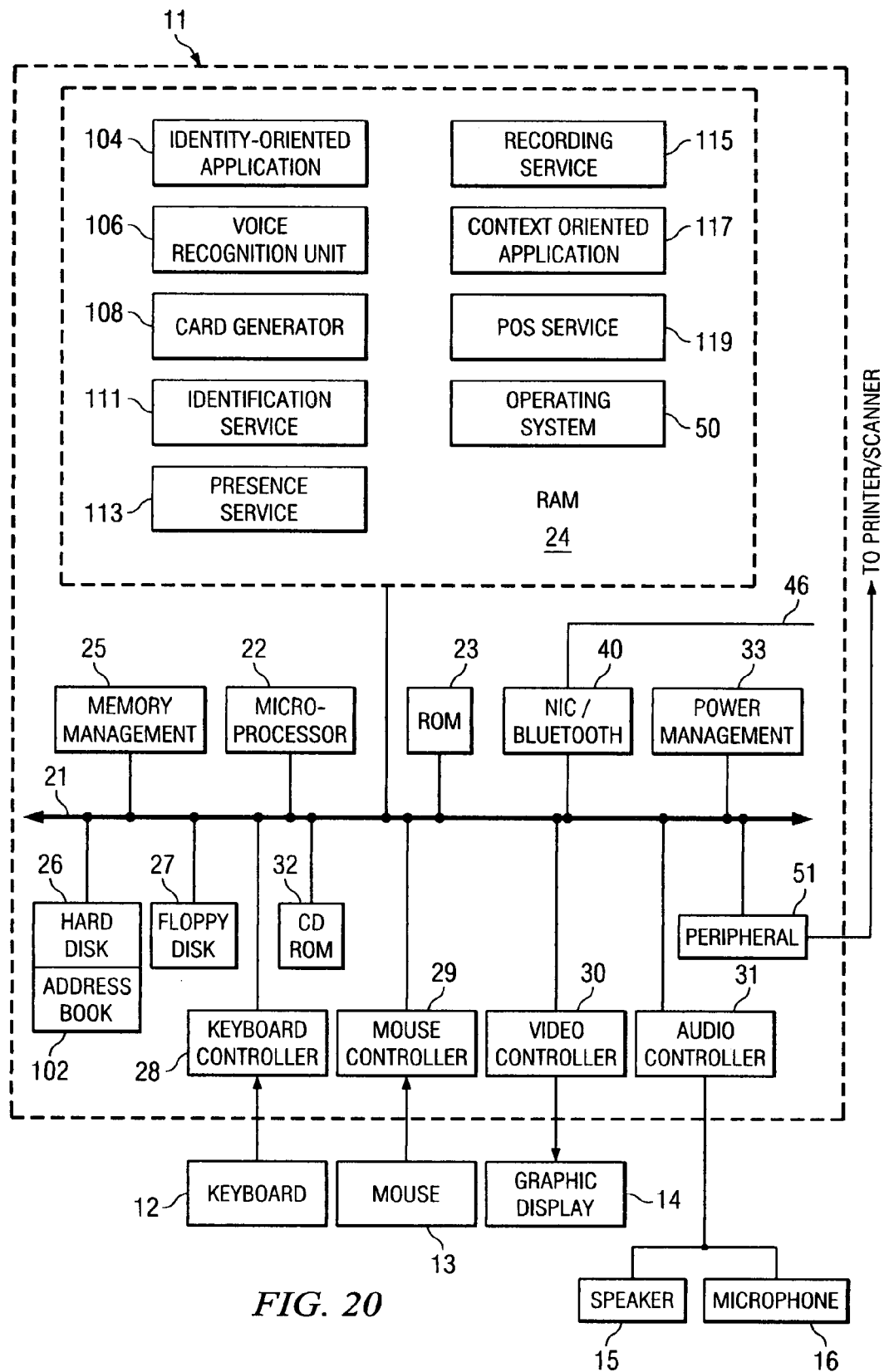
FIG. 20 is a block diagram for a processing device for use in accordance with embodiments of the present invention.

FIG. 20 shows a block diagram of components of a user device or service implemented as a computing device 2000, e.g., personal, or laptop computer or server. In some embodiments, the computing device 2000 may implement one more elements of the methods disclosed herein.

The system unit 11 includes a system bus or a plurality of system buses 21 to which various components are coupled and by which communication between the various components is accomplished. A processor 22, such as a microprocessor, is coupled to the system bus 21 and is supported by the read only memory (ROM) 23 and the random access memory (RAM) 24 also connected to the system bus 21. The computer 104 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 22. Other suitable processors may be available from Freescale Semiconductor, Inc., Advanced Micro Devices, Inc., or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database. In addition, as shown the data storage devices may be used to store an address book 102 according to embodiments of the present invention.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for the speakers 15 and microphone 16. A peripheral controller 51 may control a printer, such as a barcode printer, and a scanner, such as a barcode scanner, in accordance with the present invention. It is noted that while the various I/O controllers are illustrated as discrete entities, in practice, their functions may be performed by a single I/O controller known as a "super I/O." Thus, the figures are exemplary only.

The speakers 15 and the microphone 16 allow for audio communication during operation. In operation, keyboard strokes are detected by the keyboard controller 28 and corresponding signals are transmitted to the microprocessor 22; similarly, mouse movements (or cursor pointing device movements) and button clicks are detected by the mouse controller and provided to the microprocessor 22. Typically, the keyboard controller 28 and the mouse controller 29 assert interrupts at the microprocessor 22. In addition, a power management system 33 may be provided which causes the computer to enter a power down mode if no activity is detected over a predetermined period.

One or more network interfaces 40 enable communication over a network 46, such as a packet network like the Internet. The network interfaces 40 may be implemented as wired or wireless network interfaces operating in accordance with, for example, one or more of the IEEE 802.11x standards and may also or alternatively implement a Bluetooth interface.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, a floppy disk for use in the floppy disk drive 27, or the flash ROM.

As shown in the figure, the operating system 50, a security-oriented application 104, a VRU 106, a card generator 108, identification service, voice recognition unit, presence service, recording service, and context-oriented application are resident in the RAM 24. The operating system 50 functions to generate a graphical user interface on the display 14. In addition, or alternatively, in user device implementations, a telephony or conferencing client may be provided for interfacing to various applications/services.

Execution of sequences of the instructions in the programs causes the processor 22 to perform various of the process elements described herein. In alternative embodiments, hard-wired circuitry may be used in place of, or in combination with, software instructions for implementation of some or all of the methods described herein. Thus, embodiments are not limited to any specific combination of hardware and software.

The processor 22 and the data storage device 26, 27, 32 in the computer 100 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer.

Figure 21:
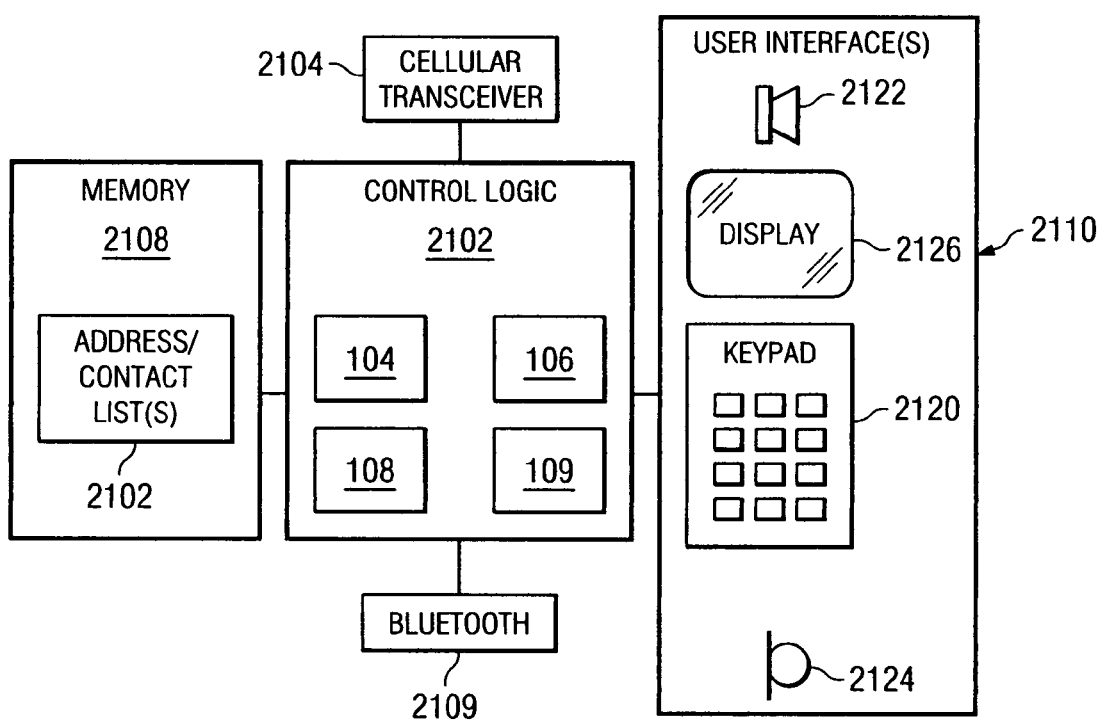
FIG. 21 is a block diagram for a processing device for use in accordance with embodiments of the present invention.

As noted above, embodiments of the present invention may be implemented in or in conjunction with a telephone, such as a wireless or cellular telephone or PocketPC. An exemplary cellular telephone 2100 including capabilities in accordance with an embodiment of the present invention is shown in FIG. 21. In some embodiments, the cellular telephone 2100 may implement one or more elements of the methods disclosed herein. As shown, the cellular telephone includes control logic 2102 and cellular transceiver 2104. The cellular transceiver 2104 allows communication over a cellular telephone network, such as a GSM or GPRS based cellular telephone network. The control logic 2102 generally controls operation of the cellular telephone and, in some embodiments, implements a security oriented application 104, a VRU 106, a card generator 108, and card writer 109, as well as other services or clients in accordance with embodiments of the present invention.

The control logic 2102 interfaces to a memory 2118 for storing, among other things, contact or address lists 107. The control logic 1002 also interfaces to a user interface(s) 2110. The user interface(s) 2121 can include a keypad 2120, speaker 2122, microphone 2124, and display 2126. The keypad may include one or more "hard" keys and may be implemented in whole or in part as a cursor pointing device in association with one or more "virtual" keys on the display 2126. In general, a user may make use of the keypad 2120 and display 2126 to enter contact information, and may speak into the microphone to provide the audio input(s). It is noted that other interfaces, such as voice activated interfaces may be provided. Thus, the figure is exemplary only. In addition, a Bluetooth interface 2109 may be provided, as well as a peripheral controller 2126 for interfacing to for example, a printer or a scanner. A memory 2108 for storing program code and data, including, for example, an address book 102 also may be provided.

While specific implementations and hardware/software configurations for the mobile computing device have been illustrated, it should be noted that other implementations and hardware configurations are possible and that no specific implementation or hardware/software configuration is needed. Thus, not all of the components illustrated may be needed for the mobile computing device implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method comprising:
providing a communication system comprising a plurality of microphones, an identification unit, at least one graphical interface, and a positioning unit, the microphones comprising a first microphone, a second microphone and a third microphone;
the identification unit receiving electronic business card data;
the identification unit receiving a first input received by the first microphone;
the identification unit identifying a speaker providing the first input;
the positioning unit detecting the first microphone receiving of the first input;
the positioning unit determining how much time elapses between the first microphone receiving the first input and the second microphone receiving the first input to determine a position of the speaker;
the positioning unit determining how much time elapses between the first microphone receiving the first input and the third microphone receiving the first input to determine the position of the speaker;
the at least one graphical interface displaying the position of the speaker via a displayed map of a conference room, the displayed map of the conference room having participant indicia identifying conference participant positions adjacent indicia identifying the position of the speaker, the at least one graphical interface displaying the position of the speaker based on the determined position of the speaker made by the positioning unit;
the at least one graphical interface also displaying information about the speaker, the information about the speaker being based on information from the electronic business card data;
wherein at least a portion of the information about the speaker is spaced apart from the displayed map of the conference room; and
wherein the participant indicia identifying conference participant positions comprises images representing different participants positioned around an image representing a conference table of the conference room and wherein the display of information about the speaker is comprised of an image representing the speaker that is spaced apart from the displayed map.

2. A method in accordance with claim 1, said electronic business card data comprising at least one of preprocessed voice recognition samples and digitized voice samples that are used by the identification unit to identify the speaker.

3. A method in accordance with claim 1, further comprising updating presence contexts for the speaker for confirming the identity of the speaker.

4. A method in accordance with claim 1, wherein said receiving of said electronic business card data uses a Bluetooth protocol.

5. A telecommunications system, comprising:
a network;
a plurality of microphones comprising a first microphone, a second microphone, and a third microphone;
a conference control unit operably coupled to the network and configured to poll a plurality of user devices for audio electronic business card data and receive said data from said plurality of user devices and identify participants to a conference based on said audio electronic business card data; and
a conference mapping unit identifying locations of participants responsive to their speaking and displaying a map of said locations of the participants;
said identifying locations of each of said participants occurring by the first microphone receiving voice input from the participant and wherein a first amount of time it takes for the voice input to be received by the second microphone and a second amount of time it takes for the voice input to be received by the third microphone is determined such that the location of the participant is determined for identifying on the map;
wherein said conference control unit is communicatively connected to at least one graphical interface such that the at least one graphical interface displays the map, the map being a representation of a conference room having participant indicia identifying the determined locations of the participants adjacent indicia identifying which of the participants is currently speaking; and
wherein said conference control unit is communicatively connected to the at least one graphical interface such that information about the currently speaking participant is displayed and at least a portion of the information about the currently speaking participant is displayed spaced apart from the displayed map, the information about the currently speaking participant being based on information from the received audio electronic business card data.

6. A telecommunications system in accordance with claim 5 wherein said audio electronic business card data includes one or more speech samples, and wherein said conference control unit is configured to perform an identification by comparing said one or more speech samples to conference speaker voices.

7. A telecommunications system in accordance with claim 6, wherein said audio electronic business card data includes preprocessed voice recognition data, and wherein said conference control unit is configured to perform an identification by comparing said preprocessed voice recognition data to data derived from conference speaker voices.

8. A telecommunications system in accordance with claim 6, further comprising a presence control unit, the presence control unit configured to update a presence status of a participant based on an identification from the audio electronic business card data.

9. A telecommunications system in accordance with claim 6, wherein said conference mapping unit performs an acoustic triangulation to determine the location of each of the participants.

10. A telecommunications method, comprising:
receiving audio electronic business card data at a conference control unit;
identifying conference participants from the audio electronic business card data and speech data of conference participants;
determining locations of the conference participants responsive to detecting individual speech and said identifying of conference participants and performing an acoustic triangulation based on speech input provided by each of the conference participants, for each conference participant, the speech input being provided to a first microphone, second microphone and third microphone and the acoustic triangulation utilizing a first time difference between when the speech input was received by the first microphone as compared with when the speech input was received by the second microphone and a second time difference between when the speech input was received by the first microphone as compared with when the speech input was received by the third microphone to determine the location of the conference participant;
at least one graphical interface displaying a map, the map having indicia identifying the determined locations of each conference participant located in a conference room and also having indicia identifying which of the conference participants is currently speaking;
the at least one graphical interface also displaying information about the currently speaking participant, the information about the currently speaking participant being based on information from the electronic business card data;
wherein at least a portion of the information about the currently speaking participant is spaced apart from the displayed map of the conference room; and
wherein the participant indicia identifying conference participant positions comprises images representing different participants positioned around an image representing a conference table of the conference room and wherein the display of information about the currently speaking participant is comprised of an image representing the currently speaking participant that is spaced apart from the displayed map.

11. The method of claim 10 wherein said identifying conference participants comprises comparing said speech data with one or more speech samples on said audio electronic business card data.

12. The method of claim 11 wherein said identifying conference participants comprises comparing data derived from said speech data with preprocessed voice recognition data on said audio electronic business card data.

13. The method of claim 11 further comprising updating a presence status of a conference participant based on an identification from the audio electronic business card data.

* * * * *